United States Patent [19]

Buckler et al.

[11] 3,976,608

[45] Aug. 24, 1976

[54] FILLED THERMOPLASTIC

[75] Inventors: Ernest Jack Buckler; Michael Hugh Richmond, both of Sarnia, Canada

[73] Assignee: Polysar Limited, Sarnia, Canada

[22] Filed: Apr. 15, 1975

[21] Appl. No.: 568,328

[30] Foreign Application Priority Data

May 7, 1974 Canada .............................. 199182

[52] U.S. Cl. ................................. 260/4 AR; 260/5; 260/17.4 R; 260/33.6 AQ; 260/33.6 UA; 260/42.56

[51] Int. Cl.² ...................... C08K 5/01; C08L 1/02; C08L 3/02; C08L 7/00

[58] Field of Search.... 260/4, 5, 33.6 AQ, 33.6 UA, 260/42.56, 876 R, 17.4 R, 880 R

[56] References Cited

UNITED STATES PATENTS

| | | | |
|---|---|---|---|
| 3,284,542 | 11/1966 | Carrock et al. | 260/4 R |
| 3,654,219 | 4/1972 | Boyer et al. | 260/42.56 |
| 3,846,360 | 11/1974 | Needham | 260/42.56 |

*Primary Examiner*—Lewis T. Jacobs
*Assistant Examiner*—H. H. Fletcher
*Attorney, Agent, or Firm*—Stevens, Davis, Miller & Mosher

[57] ABSTRACT

A filled thermoplastic composition is produced by first preparing a masterbatch of an impact polystyrene, a rubber, an oil and a filler and by secondly mixing the masterbatch with a polystyrene composition. The filled thermoplastic composition has acceptable properties.

10 Claims, No Drawings

FILLED THERMOPLASTIC

The present invention is directed to a process for the production of filled thermoplastic compositions. More particularly, it is directed to filled polystyrene compositions.

For many years, the cost of polystyrene and impact polystyrene was not much higher than the cost of fillers conventionally used in the rubber industry. From the rubber industry, it has been well known that the cost of incorporating fillers into rubber is significant but is a necessary feature to achieve the required strength properties in the rubber compounds. Such incorporation of fillers into rubber requires the use of high shear mixing equipment. Plastics generally do not require the presence of filler to achieve good strength properties. All of the above have combined in the past such that the thermoplastics industry has used very few fillers and then usually only in small amounts for limited very special applications. Consequently, the plastics industry, particularly the thermoplastic rather than the thermoset segment, has not had the need for high shear mixing equipment.

Examples of special applications where fillers have been incorporated into plastics include the fibre reinforced field and certain types of compounds such as polyvinyl chloride. Polystyrene compositions containing glass fibres are finding their place as commercial products. Similarly, some applications are being developed for polystyrene compositions containing asbestos fibres. Polyvinyl chloride compositions containing very high levels of fillers, normally white fillers, are frequently used for the exterior finish of buildings.

In the thermoplastics industry, as distinct from the thermoset industry, blending of thermoplastics with various additives usually utilizes relatively low shear mixing equipment. Thermoplastics, including polystyrene compositions, have been blended with pigments, fire retardants, antidegradants, anti-static agents and colouring agents. Many of these blends are achieved by dry mixing of powdered additive with the thermoplastic in pelletized form followed by limited further mixing, as in an extruder. These additives present in the thermoplastic do not contribute to the mechanical strength properties of the plastic. Certain materials, as for example zinc oxide, may be used during the preparation of polystyrene compositions, such as when impact polystyrene is prepared by the suspension process, zinc oxide is sometimes added as a suspending agent prior to the initiation of the polymerization — however, it is conventional practice to wash out the majority of the zinc oxide, or other similar inorganic compounds, after the completion of the polymerization. Thereby it has not been common practice to prepare polystyrene compositions containing, for example, zinc oxide present in the composition as a filler.

It is an objective of this invention to provide a method to alleviate the shortage of a thermoplastic by a process for the production of a mouldable thermoplastic composition having filler incorporated therein.

It is a further objective of this invention to provide a process for the production of a filled mouldable thermoplastic composition by a low energy consuming method.

It is a still further objective of this invention to provide a low cost mouldable thermoplastic composition having acceptable properties which composition contains fillers to replace part of the thermoplastic.

It has now been found that a filled mouldable thermoplastic composition is produced by a process wherein a masterbatch containing an impact polystyrene, filler, rubber and oil is mixed with a polystyrene composition. This process overcomes the problems due to the lack of mixing equipment, as shown hereinafter, and provides a composition of reasonable price and acceptable properties which utilizes a lesser weight of polystyrene in the final product.

Much attention has focused on the cost of energy and concurrent shortages of many chemical compounds, especially those derived from petroleum products. Styrene monomer is one material for which the supply situation may often be limited as a result of this shortage of chemical compounds. One way to extend the value of styrene polymers is that well known in the art of improving the impact strength of polystyrene by incorporating therein a small quantity of rubber. The rubber may be incorporated by mechanical mixing of the polystyrene and rubber particles or by dissolving the rubber in styrene monomer and polymerizing the styrene in the presence of the dissolved rubber. Such improved products are known as impact polystyrenes. Because of the higher strength properties of the impact polystyrene, it is frequently possible to use smaller quantities of the impact polystyrene to serve the same purpose which would otherwise be served by a crystal polystyrene.

If a means can be found of producing a composition having the desirable general properties of polystyrene and yet only containing from about 50 to about 90 percent of its weight as polystyrene, the balance of the weight being a lower cost, less energy dependent material, such a composition would be of considerable commercial value and could make a significant contribution toward alleviating material shortages. The fillers conventionally used in rubbers generally have a high specific gravity when compared to the specific gravity of polystyrene. Their use in admixture with polystyrene thereby would yield a more dense material having no volume advantage. It is also well known in the art that the incorporation of mineral fillers directly into polystyrene generally causes a reduction in the strength characteristics of the mixture.

The essential features of this invention lie in the discovery that a polystyrene product with acceptable properties can be prepared, which product contains quantities of filler, rubber and oil, in addition to at least one polystyrene. The exact reasons why such products unexpectedly possess such reasonable properties is not known. The addition of filler alone to styrene makes the polymer stiff and intractable. The addition of a rubber component to polystyrene plus filler appears to somewhat reduce the stiffening effect of the filler and leads to improvement of the impact properties. The addition of an oil appears to further reduce the stiffening effect caused by the presence of the filler and to improve the melt-flow characteristics which have been reduced by the presence of the filler and the rubber. The presence in the composition of the four components appears to be necessary to obtain the overall balance of desirable properties.

Polystyrene preparation is well known in the art. Styrene monomer, optionally containing a small amount of a solvent such as ethyl benzene, may be bulk polymerized with the aid of a free radical polymerization initiator or by thermal initiation. Styrene monomer may also be polymerized in a suspension process using a free radical polymerization initiator. Rubber modified polystyrene, more commonly known as impact polystyrene, may be produced by polymerizing rubber dissolved in styrene monomer by either a bulk process, a suspension process or a combination of bulk and suspension processes. Some impact polystyrene is also produced by mechanical blending of rubber with polystyrene but such products are not suitable for use in this invention. Examples of rubbers used in the manufacture of impact polystyrene include the styrene-butadiene rubbery polymers, the thermoplastic rubbery block vinylidene aromatic hydrocarbon-conjugated diolefin polymers, polybutadienes and polyisoprenes. Limited use is also made of ethylene-propylene-diene rubber. Numerous other rubbers have been described as usable for this purpose but have not been commercially developed. Preferred rubbers are the polybutadienes, including those prepared with an alkyl lithium catalyst and those prepared with a Ziegler Natta catalyst. The amount of rubber incorporated into the impact polystyrene may be from 1 to about 15% by weight and more usually is from about 4 to 10% by weight. Impact polystyrenes frequently also contain a small amount of a lubricant to improve the moulding characteristics. Such lubricants include mineral oils, paraffin waxes and organic esters such as butyl stearate. The amount of such lubricants incorporated into the impact polystyrenes is usually from about 1 to about 5 weight per cent.

In the process of this invention, a masterbatch is formed by blending an impact polystyrene with rubber, filler and oil. The impact polystyrene will contain from 1 to 15 weight per cent of a rubber selected from polybutadiene, polyisoprene, thermoplastic rubber block vinylidene aromatic hydrocarbon-conjugated diolefin polymers and ethylene-propylenediene rubber as hereinbefore described. The impact polystyrene must contain some grafted rubber and does not include mechanical blends of crystal polystyrene with rubber.

Suitable rubbers to be blended with the impact polystyrene in the process of forming the masterbatch are polymers of a diolefinic hydrocarbon which include styrene-butadiene rubbers containing up to 45 weight per cent of bound styrene, a blended product containing an average of from 40 to 60 weight per cent of bound styrene and being a blend of (a) styrenebutadiene rubber containing from 15 to 35 weight per cent of bound styrene and (b) styrene-butadiene polymer containing from 75 to 95 weight per cent of bound styrene, polybutadiene rubber, high cis-1,4 polyisoprene, natural rubber, thermoplastic rubber block copolymers comprising vinyl- or vinylidene-substituted aromatic hydrocarbon polymer blocks and conjugated diolefin polymer blocks, ethylene-propylene-diene rubbers or mixtures thereof. Preferred rubbers include the styrene-butadiene rubbers, the polybutadienes and the thermoplastic rubbery block copolymers. The amount of rubber added to the impact polystyrene is from 1 part by weight to about 40 parts by weight based on 100 parts by weight of the impact polystyrene. Preferred amounts of rubber are from 5 parts to 25 parts by weight per 100 parts by weight of the impact polystyrene. Suitable fillers for forming the masterbatch include the inorganic mineral fillers such as calcium or magnesium carbonates, calcium sulphate, clays, aluminum silicate, silica, talc, mica, vermiculite, asbestos fibres and glass fibres. Suitable fillers also include naturally derived products such as particulate starch, wood sawdust and the various wood flours. Also included as suitable fillers are the small sized, essentially spherical glass beads having an average diameter range of about 10 to about 60 microns. Mixtures of these fillers may also be used, for example mixtures of glass beads and an inorganic mineral filler are suitable. Quantities of filler added to the impact polystyrene are from 10 to 200 parts by weight per 100 parts by weight of impact polystyrene. Preferred amounts of filler are from 25 to 100 parts by weight. Suitable oils that may be added to form the masterbatch include the mixed naphthenic-aromatic oils and, when colour is not a problem, the highly aromatic oils. The amount of oil is from 1 to 40 parts by weight per 100 parts by weight of impact polystyrene, and preferably from 5 to 25 parts by weight.

The masterbatch of impact polystyrene, rubber, filler and oil is prepared by any suitable method wherein the impact polystyrene can be melted or fluxed and the other components can be well mixed with and dispersed in the molten polystyrene. For example, the high impact polystyrene can be fed to a hot two-roll mill, maintained at a temperature of at least about 110°C to about 160°C, preferably from 120°C to about 150°C, fluxed on the mill rolls and the rubber filler and oil added separately or as a combination of any two or three components. The mixture is maintained on the hot mill rolls until good dispersion is obtained. The masterbatch can be removed as sheet product and used, per se, or can be pelletized. The masterbatch can also be prepared in an internal mixer such as a Banbury mixer, using a temperature of about 110°C to about 160°C, preferably about 120°C to 145°C. The masterbatch can also be prepared in an extruder providing that adequate mixing is achieved with the extruder.

In the process of this invention, the masterbatch is mixed with a polystyrene composition to yield the final product. The masterbatch is preferably supplied to this mixing operation in pellet form. The mixing with the polystyrene composition can then be achieved with equipment readily available in the thermoplastics industry. Pellet form masterbatch can be dry mixed with pellet form polystyrene composition in a tumbler and the mixed pellets then fed to the shaping equipment, optionally via a heated extruder. Pellet form masterbatch can be metered into the hopper of a heated extruder and pellet form polystyrene can be separately metered into the same hopper of the extruder, the mixing then being achieved within the barrel of the heated extruder. The extruder may be used solely for the mixing or can be part of a forming machine such as an injection moulding machine, as is well known in the art. Pellet form masterbatch can be metered into a heated extruder which forms a part of the process for the manufacture of polystyrene. For example, a devolatilizing extruder is frequently used to remove the final traces of monomer from polystyrene compositions, whether produced by a bulk polymerization process or a suspension process or a combined bulk/suspension process. The masterbatch can be added to this extruder for mixing with the polystyrene composition. Mixing of the masterbatch with the polystyrene composition can also be achieved on a hot mill or on a Banbury mixer, if such are available.

The polystyrene composition to be mixed with the masterbatch is selected from crystal polystyrene and impact polystyrenes. Various grades of crystal polystyrene may be used. An impact polystyrene when used will usually contain a relatively low proportion of rubber such as less than about 10 weight per cent. The exact nature of the polystyrene composition which is mixed with the masterbatch is dependent more on cost and availability of the polystyrene composition.

In the mixing of the masterbatch with the polystyrene composition, the proportion of the two components to be mixed depends on the composition of the masterbatch and the desired properties of the final product. Generally, it is preferred that the final product should contain at least about 5 parts by weight of filler per 100 parts by weight of final product. The final product will not contain more than about 50 parts by weight of filler per 100 parts by weight of final product. Preferably, the final product contains from about 10 to about 30 parts by weight of filler per 100 parts by weight of final product.

The final product is a filled, mouldable thermoplastic composition of acceptable properties, reasonable cost and which can be readily formed into its end product shape by any of the conventional means. The advantages of this product over the conventional polystyrene composition lie in the reduced cost associated with the product of this process and in the reduction of the amount of styrene used per pound and per unit volume of final product. It is surprising that the final product should have such an acceptable balance of properties, which balance of properties is attributed to the use of a masterbatch of the composition hereinbefore shown to incorporate the filler, in the light of the prior art knowledge of the properties of some thermoplastics containing only filler. The final product is novel by virtue of the type and number of components contained in it and the complete lack of anticipatory literature on the subject. The process of making the final product is novel in the light of the methods whereby the components are incorporated into it.

In the following examples, which are illustrative of the invention and not intended to limit the scope thereof, the following materials and test methods were used.

The impact polystyrene contained 9 weight % of a high (98%) cis-1,4 polybutadiene incorporated during polymerization of the styrene. The properties of this polystyrene are given as the "Control" in Example 1. The wood flour was kiln dried Ponderosa pine, supplied by International Filler Corporation of New York, one sample (No. 60) passing a 60 mesh screen and a second sample (No. 100) passing a 100 mesh screen. The calcium carbonate is a wet ground limestone, having a specific gravity of 2.71 and an average particle size of 2 microns known as CAMEL-WITE (CAMEL-WITE is a registered trademark). The corn starch was a fine grain corn starch having a specific gravity of 1.5 and an average particle size of about 4 microns, manufactured by St. Lawrence Starch Co. The oil is a mixed paraffinic/naphthenic hydrocarbon oil having a specific gravity of 0.844 to 0.864 at 25°C, a viscosity of 100°F of 95–105 SUS, a kinematic viscosity at 100°F of 19.3–21.7 centistokes and a flash point of 365°F known as DRAKEOL 10 (DRAKEOL is a registered trademark). Rubber-1 is a commercial styrene-butadiene rubber containing 23.5 weight % of bound styrene and having a Mooney viscosity (ML 1+4 at 100°C) of 51, further identified as KRYLENE 1500 (KRYLENE is a registered trademark). Rubber-2 is a commercial high cis-1,4 polybutadiene having 98% cis-1,4 content and a Mooney viscosity (ML 1+4 at 100°C) of 42, further identified as TAKTENE 1203 (TAKTENE is a registered trademark). Rubber-3 is a commercially available ethylene-propylene-ethylidene norbornene polymer having a Mooney viscosity (ML 1+8 at 121°C) of 40, identified as EPsyn 40 (EPsyn is a registered trademark).

The masterbatch was prepared by mixing in a Model B Banbury internal mixer at a temperature of 270°F, a rotor speed of 77 rpm and for a time of 4½ minutes. The pellet form polystyrene was added first and fluxed: at 1½ minutes the rubber, oil and filler were added. The masterbatch was dumped from the Banbury, sheeted out on a two-roll rubber mill, with the rolls at 270°F, the sheets were cooled and then chopped into pellets.

The masterbatch cut-back was by adding pellets of polystyrene to a two-roll rubber mill maintained at 270°F and forming a band on the rolls, following which the masterbatch was slowly (over about 5 minutes) added to the fluxed polystyrene. The complete mixing time was about 10 to 15 minutes. The final composition was then sheeted off the mill.

The specimens used for testing were injection moulded. The final composition was chopped into pellets and fed to a Mini-jector ram injection machine using a ram pressure of 1100 psi, an injection temperature of 425°F and a mould temperature of 100°F on a one minute cycle. The test methods used were:

| | |
|---|---|
| melt flow index | ASTM D 1238, Condition G |
| Izod impact | ASTM D 256 |
| tensile strength and elongation | ASTM D 638 |
| flexural strength and flexural modulus | ASTM D 790 |
| heat distortion temp. | ASTM 648 |

EXAMPLE 1

The composition of the masterbatch, the details of the masterbatch cut-back and the properties of the final composition are given in Table 1, together with the properties of the impact polystyrene which contains no additives beyond those normally present as a result of the manufacturing process. The final product of Experiment No. 1(a) contains 62.5 weight % of polystyrene, Experiment No. 1(b) contains 72.8 weight % of polystyrene, Experiment No. 2 contains 72.8 weight % of polystyrene and Experiment No. 3 contains 60 weight per cent of polystyrene. The results show that the final compositions have properties suitable for many applications, the range of properties being influenced by the amounts of the components in the final composition.

TABLE 1

| Experiment | No. 1 | No. 2 | No. 3 | Control |
|---|---|---|---|---|
| A. Masterbatch composition | (parts by weight) | | | |
| Impact polystyrene | 40 | 40 | 20 | 100 |
| Wood flour No. 60 | 40 | — | — | |
| Wood flour No. 100 | — | 40 | 60 | |
| Oil | 10 | 10 | 10 | |
| Rubber-1 | 10 | 10 | 10 | |

TABLE 1-continued

| B. Masterbatch cut-back | (a) | (b) | | |
|---|---|---|---|---|
| Masterbatch | 125 | 100 | 100 | 100 |
| Impact polystyrene | 75 | 120 | 120 | 100 |

| Experiment | No. 1(a) | No. 1(b) | No. 2 | No. 3 | Control |
|---|---|---|---|---|---|
| C. Properties of final composition | | | | | |
| MFI, g/10 min. | 15.8 | 14.9 | 17.1 | 6.0 | 7.2 |
| Izod strength, ft.lbs/inch | 0.5 | 0.5 | 0.5 | 0.4 | 0.9 |
| Tensile strength, psi | 2250 | 2580 | 2935 | 2350 | 3645 |
| Elongation, % | 1.0 | 1.0 | 1.7 | 1.0 | |
| Flex. strength, psi | 3440 | 3835 | 3835 | 3540 | 5330 |
| Flex. modulus ×10$^{-3}$, psi | 360 | 360 | 305 | 376 | 288 |
| Heat distortion temperature °C | 72.9 | 74.6 | 76.2 | 75.3 | 86.1 |

EXAMPLE 2

Table 2 lists the details of preparation of the two final compositions, both of which contain 70 weight per cent of polystyrene. The results show that mixtures of fillers can be used. A sheet of the final composition of Experiment 2 was buried in the ground at a depth of about eight inches and on inspection after 8 weeks, the sheet was partially degraded and sufficiently brittle that it broke up into many small pieces. Clearly such a composition would answer many of the disposal requirements currently of ecological concern with respect to plastic products.

TABLE 2

| Experiment | No. 1 | No. 2 |
|---|---|---|
| A. Masterbatch composition | (parts by weight) | |
| Impact polystyrene | 40 | 40 |
| Corn starch | 40 | 20 |
| Calcium carbonate | — | 20 |
| Oil | 10 | 10 |
| Rubber-1 | 10 | 10 |
| B. Masterbatch cut-back | (parts by weight) | |
| Masterbatch | 100 | 100 |
| Impact polystyrene | 100 | 100 |
| C. Properties of final composition | | |
| MFI, g/10 min. | 5.4 | 11.4 |
| Izod impact, ft.lbs/inch | 0.5 | 1.2 |
| Tensile strength, psi | 1780 | 1995 |
| Elongation, % | 24 | 14 |
| Flex. strength, psi | 3350 | 3250 |
| Flex. modulus ×10$^{-3}$, psi | 225 | 234 |

TABLE 2-continued

| Experiment | No. 1 | No. 2 |
|---|---|---|
| Heat distortion temperature, °C | 73.8 | 72.5 |

EXAMPLE 3

The compositions shown in Table 3 were prepared for evaluation. The weight per cent polystyrene in the final compositions were, for Experiment Nos. 1 and 2 70%, for Experiment No. 3(a) 62.5% and for Experiment No. 3(b) 72.8%. The results show that the rubber component added can be selected from a range of synthetic rubbers and that, although the properties show some degree of variation, the overall range of properties is not strongly dependent on the type of rubber used.

TABLE 3

| Experiment | No. 1 | No. 2 | No. 3 | |
|---|---|---|---|---|
| A. Masterbatch composition | (parts by weight) | | | |
| Impact polystyrene | 40 | 40 | 40 | |
| Calcium carbonate | 40 | 40 | 40 | |
| Oil | 10 | 10 | 10 | |
| Rubber-2 | 10 | — | — | |
| Rubber-3 | — | 10 | — | |
| Rubber-1 | — | — | 10 | |

| Experiment | No. 1 | No. 2 | No. 3(a) | No. 3(b) |
|---|---|---|---|---|
| B. Masterbatch cut-back | (parts by weight) | | | |
| Masterbatch | 100 | 100 | 125 | 100 |
| Impact polystyrene | 100 | 100 | 75 | 120 |
| C. Properties of final composition | | | | |
| MFI, g/10 min. | 16.8 | 11.6 | 14.0 | 12.9 |
| Izod impact, ft.lbs/inch | 1.5 | 0.9 | 1.8 | 1.7 |
| Tensile strength, psi | 1975 | 2300 | 2455 | 2400 |
| Elongation, % | 27 | 17 | 31 | 38 |
| Flex. strength, psi | 3110 | 3360 | 3410 | 3480 |
| Flex. modulus ×10$^{-3}$, psi | 208 | 219 | 230 | 237 |
| Heat distortion temperature, °C | 76.4 | 74.2 | 72.5 | 72.3 |

EXAMPLE 4

The masterbatches shown in Table 4 were cut-back by mixing, at two levels, with polystyrene, the final compositions of Experiments Nos. 1(a) and 2(a) containing 66.7 weight per cent of polystyrene and of Experiments Nos. 1(b) and 2(b) containing 75 weight per cent of polystyrene. These results show that the composition of the masterbatch can be varied considerably and yet, on cutting back with polystyrene, will yield satisfactory final compositions.

TABLE 4

| Experiment | No. 1 | No. 2 | | |
|---|---|---|---|---|
| A. Masterbatch composition | (parts by weight) | | | |
| Impact polystyrene | 50 | 50 | | |
| Calcium carbonate | 40 | 40 | | |
| Oil | 5 | 3 | | |
| Rubber-1 | 5 | 7 | | |

| Experiment | No. 1(a) | No. 1(b) | No. 2(a) | No. 2(b) |
|---|---|---|---|---|
| B. Masterbatch cut-back | parts by weight | | | |
| Masterbatch | 133 | 100 | 133 | 100 |
| Impact polystyrene | 67 | 100 | 67 | 100 |
| C. Properties of final composition | | | | |
| MFI, g/10 min. | 11.2 | 11.5 | 7.0 | 8.2 |
| Izod impact ft. lbs/inch | 1.2 | 1.1 | 1.2 | 1.2 |
| Tensile strength psi | 2160 | 3075 | 2525 | 3075 |
| Enlongation % | 25 | 45 | 39 | 46 |
| Flex. strength psi | 3480 | 3945 | 4000 | 4170 |
| Flex. modulus psi | 243 | 258 | 260 | 262 |
| Heat distortion temp. O°C | 74.1 | 78.7 | 81.3 | 83.7 |

EXAMPLE 5

The filled polystyrene products shown in Table 5 were tested and found to have the properties shown in the same table. The properties show these products to be acceptable for many applications where impact polystyrene would otherwise be used and at a considerable saving in cost.

TABLE 5

| Experiment | No. 1 | No. 2 | No. 3 | No. 4 |
|---|---|---|---|---|
| Composition | parts by weight | | | |
| Impact polystyrene[1] | — | 100 | 100 | 100 |
| Impact polystyrene[2] | 59.8 | — | — | — |
| Wood flour No. 100 | 29.4 | 67 | — | — |
| Calcium carbonate | — | — | 50 | — |
| Glass beads[3] | — | 33 | 50 | — |
| Asbestos[4] | — | — | — | 25 |
| Rubber-1 | 5.85 | 10 | 10 | 10 |
| Oil | 5.85 | 10 | 10 | 10 |
| Property | | | | |
| MFI, g/10 min. | 12.3 | 7.1 | 6.4 | 12.4 |
| Izod impact, ft.lbs/inch | 0.4 | 0.5 | 0.7 | 0.9 |

Notes:
[1]Impact polystyrene contains 9 weight percent of polybutadiene
[2]Impact polystyrene contains 5.5 weight percent of polybutadiene.
[3]Glass beads are spheres with an average diameter of about 30 microns, type size 3000 manufactured by Potters Bros., Inc.
[4]Milled asbestos fibre type 7TF02 manufactured by Johns-Manville.

EXAMPLE 6

A masterbatch was prepared containing 25 parts by weight of a different high impact polystyrene (BASF grade 476L), 60 parts by weight of calcium carbonate, 10 parts by weight of a different rubber namely a blended styrene-butadiene product containing approximately 55 weight per cent of bound styrene and known as SS-255 (SS is a registered trademark) and 5 parts by weight of oil.

This masterbatch was cut back with a mixture of crystal polystyrene and high impact polystyrene (BASF grades 165H and 476L respectively) to yield a product of composition.

| | |
|---|---|
| high impact polystyrene | 55.7 weight % |
| crystal polystyrene | 19.3 weight % |
| SS-255 | 3.3 weight % |
| calcium carbonate | 20 weight % |
| oil | 1.7 weight % | and the product was found to have the following properties:

| | | |
|---|---|---|
| MFI | g/10 min. | 2.5 |
| Izod impact | ft.lbs./inch | 1.35 |
| Tensile strength | psi | 3810 |
| Elongation | % | 44 |
| Flexural strength | psi | 4585 |
| Flexural modulus ×10⁻³ | psi | 354 |
| Heat distortion temp. | °C | 88 |

What is claimed is:

1. A process for the manufacture of a mouldable filled polystyrene product wherein a masterbatch is mixed with a polystyrene characterized in that said masterbatch comprises 100 parts by weight of an impact polystyrene which contains from 1 to about 15 weight per cent of a rubber selected from polybutadiene, polyisoprene, thermoplastic rubber block vinylidene aromatic hydrocarbon-conjugated diolefin polymers and ethylene-propylene-diene rubber, from 1 to 40 parts by weight of a rubber which is a polymer of a diolefinic hydrocarbon, from 10 to 200 parts by weight of a filler selected from calcium carbonate, magnesium carbonate, calcium sulphate, clay, silica, talc, mica, vermiculite, asbestos fibres, glass fibres, particulate starch, wood sawdust, wood flour, glass beads having an average diameter of about 10 to about 60 microns or mixtures thereof, and from 1 to 40 parts by weight of an oil selected from mixed naphthenic/aromatic or highly aromatic oils, said mixing being at a temperature above the softening point of polystyrene, said masterbatch being mixed with sufficient polystyrene to yield the mouldable filled polystyrene product containing from 5 to 50 parts by weight of said filler per 100 parts by weight of said filled polystyrene product.

2. The process of claim 1 in which said polymer of a diolefinic hydrocarbon is selected from styrene-butadiene rubbers containing up to 45 weight per cent of bound styrene, a blended product containing an average of from 40 to 60 weight per cent of bound styrene and being a blend of (a) styrene-butadiene rubber containing from 15 to 35 weight per cent of bound styrene and (b) styrene-butadiene polymer containing from 75 to 95 weight per cent of bound styrene, polybutadiene, high cis-1,4 polyisoprene, natural rubber, thermoplastic rubbery block copolymers comprising vinyl- or vinylidene-substituted aromatic hydrocarbon polymer blocks and conjugated diolefin polymer blocks, ethylene-propylenediene rubbers or mixtures thereof.

3. The process of claim 2 wherein the polystyrene mixed with the masterbatch is selected from crystal polystyrene and impact polystyrene.

4. The process of claim 1 in which the mixing of the masterbatch is at a temperature of about 110°C to about 160°C in an internal mixer or on a two-roll mill.

5. The process of claim 3 in which the masterbatch and polystyrene are mixed by (a) tumbling in dry pellet form and (b) feeding the tumbled mixture to a heated extruder.

6. The process of claim 3 wherein the masterbatch and polystyrene are separately metered to a heated extruder and mixed therein, said extruder optionally forming a part of a process for the manufacture of polystyrene.

7. A mouldable filled polystyrene product which comprises a mixture of a masterbatch and polystyrene characterized in that said masterbatch comprises 100 parts by weight of an impact polystyrene which contains from 1 to about 15 weight per cent of a rubber selected frm polybutadiene, polyisoprene, thermoplastic rubber block vinylidene aromatic hydrocarbon — conjugated diolefin polymers and ethylene-propylene-diene rubber, from 1 to 40 parts by weight of a polymer of a diolefinic hydrocarbon selected from styrenebutadiene rubbers containing from 17 to 45 weight per cent of bound styrene, a blended product containing an average of from 40 to 60 weight per cent of bound styrene and being a blend of (a) styrene-butadiene rubber containing from 15 to 35 weight per cent of bound sytrene and (b) styrene-butadiene polymer containing from 75 to 95 weight per cent of bound styrene, polybutadiene, high cis-1,4 polyisoprene, natural rubber, thermoplastic rubbery block copolymers comprising vinyl- or vinylidene-substituted aromatic hydrocarbon polymer blocks and conjugated diolefin polymer blocks, and ethylene-propylene-diene rubbers, from 10 to 200 parts by weight of a filler selected from calcium carbonate, magnesium carbonate, calcium sulphate, clay, aluminum silicate, silica, talc, mica, vermiculite, asbestos fibres, glass fibres, particulate starch, wood sawdust, wood flour, glass beads having an average diameter of about 10 to about 60 microns and mixtures thereof, and from 1 parts 40 parts, by weight of a mixed naphthenic/aromatic or highly aromatic oil, said mixture containing from 5 to 50 parts by weight of said filler per 1.0 parts by weight of said filled polystyrene product.

8. The product of claim 7 in which the polystyrene mixed with the masterbatch is selected from crystal polystyrene and impact polystyrene.

9. The product of claim 7 wherein the impact polystyrene contains from 4 to 10 weight per cent of a polybutadiene, the masterbatch contains from 5 to 25 parts by weight of a polymer selected from the styrene-butadiene rubbers, polybutadiene and the thermoplastic rubbery block copolymers, from 25 to 100 parts by weight of a filler selected from particulate starch, wood sawdust and wood flour, and from 5 to 25 parts by weight of a mixed naphthenic/aromatic oil, said filled polystyrene product containing from 10 to 30 parts by weight of filler per 100 parts by weight of final product.

10. The product of claim 7 wherein the impact polystyrene contains from 4 to 10 weight per cent of a polybutadiene, the masterbatch contains from 5 to 25 parts by weight of a polymer selected from (1) a blended product containing an average of from 40 to 60 weight per cent of bound styrene and being a blend of (a) styrene-butadiene rubber containing from 15 to 35 weight per cent of bound styrene and (b) styrene-butadiene polymer containing from 75 to 95 weight per cent of bound styrene and (2) polybutadiene, from 25 to 100 parts by weight of a filler selected from calcium carbonate, calcium sulphate, clay and silica, and from 5 to 25 parts by weight of a mixed naphthenic/aromatic oil, said filled polystyrene product containing from 10 to 30 parts by weight of filler per 100 parts by weight of final product.

* * * * *

UNITED STATES PATENT AND TRADEMARK OFFICE
CERTIFICATE OF CORRECTION

PATENT NO. : 3,976,608
DATED : August 24, 1976
INVENTOR(S) : Ernest Jack BUCKLER et al It is certified that error appears in the above-identified patent and that said Letters Patent are hereby corrected as shown below:

Claim 7, Column 12, line 7, change "1.0" to -- 100 --.

Signed and Sealed this

Seventh Day of November 1978

[SEAL]

Attest:

RUTH C. MASON
Attesting Officer

DONALD W. BANNER
Commissioner of Patents and Trademarks